(12) United States Patent
Schmitt

(10) Patent No.: US 6,201,702 B1
(45) Date of Patent: Mar. 13, 2001

(54) COMPUTER WITH INTERCHANGEABLE COVERS AND METHOD FOR CONFIGURING A COMPUTER CHASSIS

(75) Inventor: Ty Schmitt, Round Rock, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/231,146

(22) Filed: Jan. 15, 1999

(51) Int. Cl.⁷ .............................. G06F 1/16; H05K 5/02
(52) U.S. Cl. ........................................... 361/725; 361/727
(58) Field of Search ................................. 361/724, 725, 361/727

(56) References Cited

U.S. PATENT DOCUMENTS

| | | |
|---|---|---|
| 4,971,563 | 11/1990 | Wells, III . |
| 5,513,068 | 4/1996 | Girard . |
| 5,748,442 | 5/1998 | Toor . |
| 5,896,273 * | 4/1999 | Varghese et al. ................ 361/727 X |
| 5,971,506 * | 10/1999 | Dubin .............................. 361/727 X |

\* cited by examiner

Primary Examiner—Jeffrey Donels
(74) Attorney, Agent, or Firm—Haynes and Boone, L.L.P.

(57) ABSTRACT

A computer or component system according to which a first cover is attached to a chassis, and a second cover is adapted to replace the first cover. Rack mount hardware is mounted on one of the covers for engaging a corresponding member in a rack system when the chassis is mounted in the rack system, and the other cover is free of any rack mount hardware, so that it can be used on a desktop.

19 Claims, 3 Drawing Sheets

COMPUTER WITH INTERCHANGEABLE COVERS AND METHOD FOR CONFIGURING A COMPUTER CHASSIS

BACKGROUND

The present disclosure relates to a computer and method for configuring same, and more particularly, to such a computer and method in which the computer is adapted for rack mounting and for use on a desktop, or the like.

In large installations involving a plurality of computers, such as mini-tower or mid-tower computers, the individual computers are usually placed on a rack mount system formed by a cabinet having a plurality of vertically stacked shelves. Because a rack mount system may only be a certain height (based on industry standards and safety considerations), the amount of available space for mounting each computer is limited especially when a shelf is used for each computer. This problem is especially acute in connection with systems that require a relatively large number of computers because the cumulative space taken up by the shelves is significant.

To overcome these problems, slide assemblies have been developed that mount each computer to the rack system without the need for shelves. These slide assemblies include a pair of telescoping rails with one rail of each pair being attached to a cover of the computer and one rail of the other pair being attached to an opposed cover of the computer. The other rails of each pair are attached to the rack system, and ball bearings extend between the telescoping rails of each pair to permit slidable movement between the rails to enable the computer to slide between a retracted and an extended position. This eliminates the need for shelves and thus saves considerable space in the rack system, especially in connection with systems that contain a relatively high number of computers.

However, mounting the rails directly to the computer in this manner is undesirable because of the resulting screw holes and cosmetic blemishes that are left on the covers of the computer that receive the rails. This, of course, renders the computer unsightly if the rails are removed when it is desired to use the computer on a desktop, or the like.

SUMMARY

The present disclosure, therefore, provides a system and method according to which a component, such as a computer, is rack mountable without the use of shelves, yet can easily be reconfigured for desktop use without any of the above problems.

To this end, a computer, or component, system is provided and includes a first cover attached to a chassis, and a second cover adapted to replace the first cover. Rack mount hardware is mounted on one of the covers for engaging a corresponding member in a rack system when the chassis is mounted in the rack system, and the other cover is free of any rack mount hardware, so that it can be used on a desktop.

A major advantage is achieved with the system and method of the present disclosure because the computer can be used in an environment outside of the rack system, such as on a desktop, without any cosmetic blemishes on any of the covers being visible, yet can easily be reconfigured for use in a rack system without the need for shelves.

DESCRIPTION OF THE PREFERRED EMBODIMENT

Figure 1:
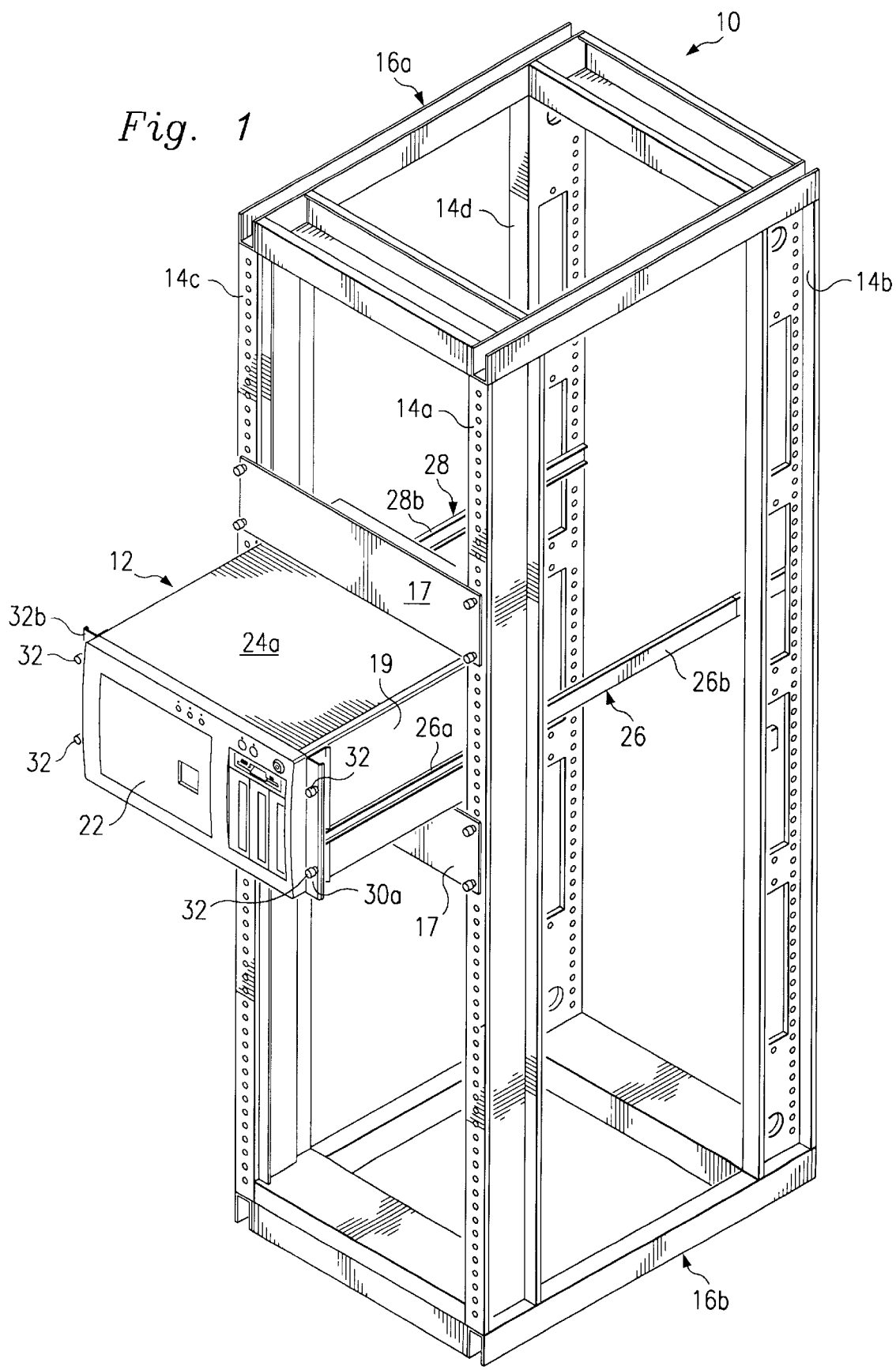
FIG. 1 is an isometric view of the computer of an embodiment of the present disclosure, shown in a partially extending position in a rack mount system.
Figure 2:
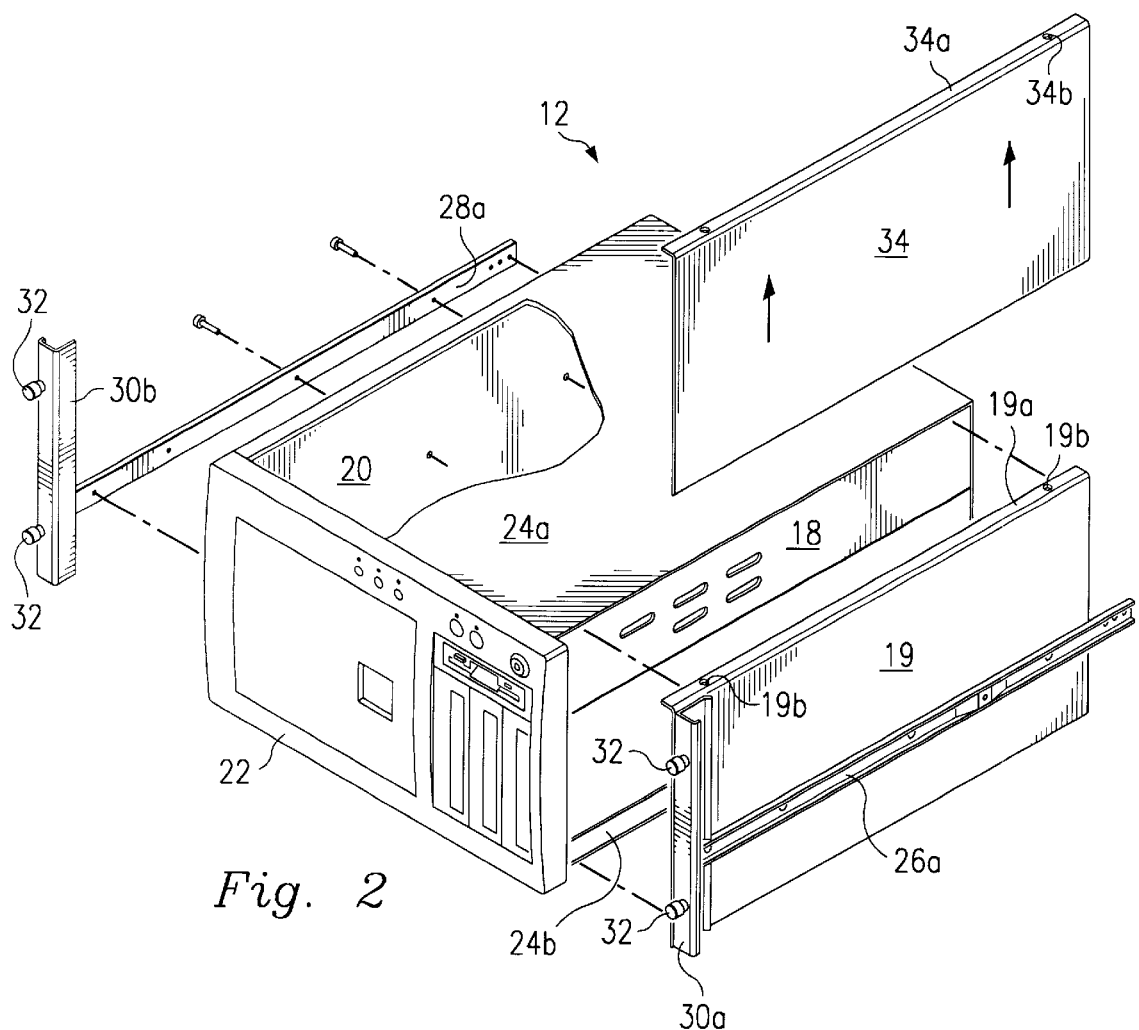
FIG. 2 is an enlarged, exploded view of the computer of FIG. 1, including a cover having rack mount hardware mounted thereto.

Referring to FIGS. 1 and 2 of the drawings, the reference numeral 10 refers, in general, to a rack system which is designed to store a plurality of computers, one of which is shown in general by the reference numeral 12. The rack system 10 is formed by four spaced upright members 14a–14d which form the corners of the system. A top frame assembly 16a and a bottom frame assembly 16b are respectively attached to the upper ends and the lower ends of the members 14a–14d, and a plurality of front plates 17 extend between, and are attached to, the members 14a and 14d. The above attachments can be made in any known manner such as by using fasteners, or the like. The plates 17 extend in a spaced relationship and each plate extends between each pair of adjacent computers that reside in the rack system 10.

The computer 12 is oriented in a horizontal position in the rack system 10 to minimize the amount of vertical space that it occupies. The computer 12 includes a rigid internal chassis, shown in general by the reference numeral 18 in FIG. 2, which is in the form of a weldment, preferably formed by riveted pieces of sheet metal, in a conventional manner.

Two spaced parallel covers 19 and 20 (FIG. 2) extend over the chassis 18 and normally form top and bottom covers, respectively, but which form side covers, or walls, in this horizontal orientation. A front cover 22, which is in the form of a bezel, extends over the front of the chassis 18 and two covers 24a and 24b (FIG. 2.) extend over corresponding portions of the chassis to form the top and bottom covers, respectively, in the horizontal orientation of the computer 12. The covers 19, 20, 22, 24a and 24b are connected to the 18 in a manner to be described.

The computer 12 is attached to the upright members 14a and 14b and to the upright members 14c and 14d by rack mount hardware including a slide assemblies 26 and 28, respectively. The assemblies 26 and 28 enable the computer to be moved between a retracted position within the rack system to an extended position shown in FIG. 1. The slide assembly 26 includes a rail 26a attached to the cover 19 of the computer 12, and a rail 26b (FIG. 1) attached to the members 14a and 14b. These attachments can be made in any conventional manner such as by inserting fasteners through aligned holes in the rail 26a and the cover 19, and though aligned holes in the rail 26b and the members 14a and 14b.

The rails 26a and 26b are disposed in a telescoping relation, and it is understood that ball bearings (not shown) extend between the rails to permit slidable movement between the rails. It is understood that the slide assembly 26 can be provided with a locking mechanism (not shown) to lock the computer 12 in an extended position and which can be manually released to permit the computer to slide to its retracted position within the rack system 10. Because the slide assembly 26 is conventional and, for example, can be of the type manufactured by General Devices of Indianapolis, Ind. and is well documented in their promotional materials which are incorporated by reference, it will not be described in any further detail. The slide assembly 28 includes a rail 28a (FIG. 2) attached to the cover 20, and a rail 28b (FIG. 1) attached to the members 14c and 14d, and because it is identical to the slide assembly 26, it will not be described in detail.

A pair of angle iron brackets 30a and 30b are mounted to the covers 19 and 20, respectively, of the computer 12 near the front end thereof by fasteners (not shown) that extend though aligned openings in the brackets and the covers. The brackets 30a and 30b each receive a pair of captive thumbscrews 32 that extend in corresponding openings in the upright members 14a and 14c, respectively to lock the computer 12 in its retracted position in the system 10.

As shown in FIG. 2, an inwardly-directed flange 19a is formed along one longitudinal edge portion of the cover 19, preferably by bending the corresponding edge portion inwardly. Two openings 19b extend through the flange 19a for receiving fasteners (not shown) that also extend through corresponding openings formed in the chassis 18, to secure the cover 19 to the chassis 18. In this context, it is understood that tabs, or fingers, (not shown) can be provided on the underside of the cover 19 which engage in corresponding slots formed in the chassis 18 to guide and further secure the cover 19 to the chassis. The covers 20, 24a and 24b can be attached to the chassis 18 in a similar manner.

Figure 3:
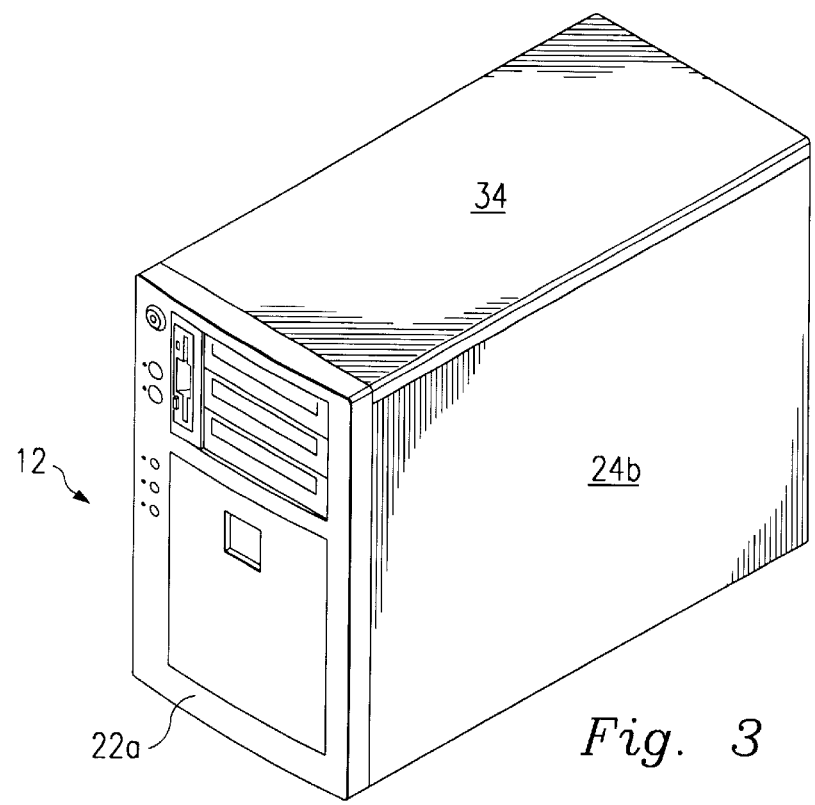
FIG. 3 is an isometric view of the computer of FIG. 2 but with the computer extending in a upright position out of the rack system, and with the cover of FIG. 2 replaced by a different cover.

As shown in FIG. 2, another cover 34 is provided that does not have a rail, such as rail 26a, mounted thereto, and can be used in place of the cover 19 when the computer is not mounted in the rack system but rather is oriented in a vertical, upright position for use on a desktop, or the like, as shown in FIG. 3. To this end, the cover 34, like the cover 19, is provided with an inwardly-directed flange 34a having two openings, similar to the flange 19a of the cover 19, for receiving fasteners to connect the cover 34 to the chassis 18 in the manner described above in connection with the cover 19.

Thus, the computer 12 could be shipped with the cover 34 attached to the chassis 18 for normal use on a desktop, or the like, as shown in FIG. 3 with the cover forming the upper, or top cover. However, a mounting kit could also be provided which would include the rail 26b and the bracket 30b, and the cover 19 with the rail 26a and the bracket 30a attached thereto. Therefore, if the user wanted to reconfigure the computer for use in the rack system 10 as shown in FIG. 1, the cover 34 would be removed from the chassis 18 and the cover 19, with the rail 26a and the mounting bracket 30a attached thereto, would be connected to the chassis 18 in the manner described above. In this context, the cover 20 would be shipped without the rail 28a and the bracket 30b attached thereto consistent with the desktop use of the computer 12, but could be converted for use in the rack system 10 by attaching the rail 28b and the bracket 30b thereto.

If it is later desired to convert the computer 12 back to desktop use, the cover 19 would be replaced by the cover 34 and the rail 28a and the bracket 30b would simply be removed from the cover 20. Although, this latter removal would expose the holes in the cover 20 that receive the fasteners for securing the rail 28a and the bracket 30b thereto, this is of no consequence because, in the upright, desktop, position of FIG. 3, the cover 20 is located at the bottom of the chassis 18 and is thus not visible.

Another possibility would be to ship the computer 12 with the covers 19 and 20 attached to the chassis 18, and with the rails 26a and 26b, as well as the brackets 30a and 30b, respectively attached thereto in the manner described above. In this configuration, the computer 12 could easily be installed in the rack system 10 by mating the rails 26a and 28a with their corresponding rails 26b and 28b on the rack system and sliding the computer into the rack system. Of course, in the event it is later desired to use the computer 12 in a desktop environment, the cover 19 would be replaced by the cover 34, and the rail 28a and the bracket 30b would be removed from the cover 20, as discussed above. The computer 12 could then be placed in its vertical position shown in FIG. 3 with the non-blemished cover 34 at the top of the chassis.

Figure 4:
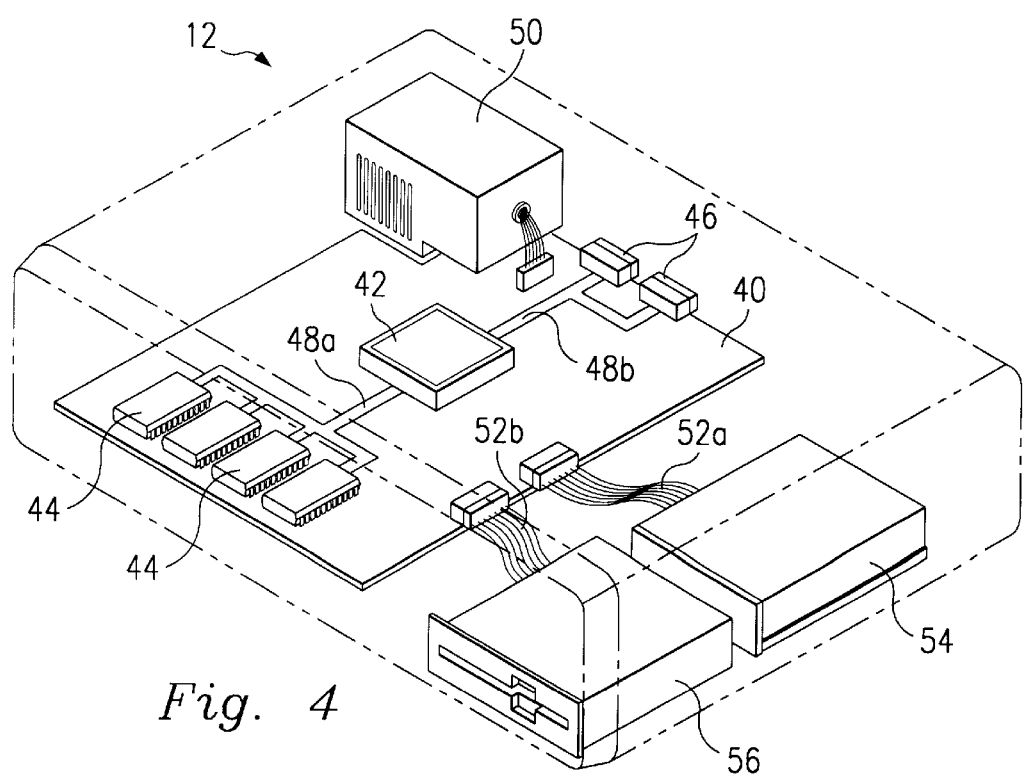
FIG. 4 is a diagrammatic representation of some of the components of the computer of FIGS. 1–3.

The components contained in the chassis of the computer 12 are shown in FIG. 4. More particularly, a motherboard 40 is mounted in the interior of the chassis 18 of the computer in any known manner, and a processor 42, a plurality of memory modules 44, and two input/output (I/O) devices 46 are mounted on the motherboard 40. Two buses 48a and 48b are also provided on the motherboard 40 and connect the processor 42 to the memory modules 44 and to the input/output devices 46, respectively. A power supply 50 is connected to the motherboard 40, and a pair of cable assemblies 52a and 52b connect the motherboard to a hard drive assembly 54 and a disk drive unit 56, respectively. Also, other components, electrical traces, electrical circuits and related devices (not shown) are provided in the chassis of the computer 12. Because these are all conventional, they will not be described in any further detail.

The present embodiments thus enjoys several advantages. For example, all the space-efficiency advantages of a rack mount system are retained without utilizing shelves which conserves space and thus allows a maximum number of computers to be installed in a rack system. Further, the computer can be quickly installed in, and removed from the rack system and the interchangeable covers allow the computer to be used in a variety of settings including a desktop, without any cosmetic blemishes.

It is understood that variations may be made in the foregoing without departing from the scope of the present embodiments. For example, features of the embodiments discussed are equally applicable to components other than computers. Also, a replacement for the cover 20 could also be provided which has rack mount hardware mounted thereto. Therefore, when it is desired to reconfigure the computer 12 for use in the rack system 10, the covers 34 and 20 would be replaced by the cover 19 and by the above-mentioned replacement for the cover 20, as described above. Additionally, the slide assemblies 26 and 28 can be attached to other covers of the computer chassis within the scope of the embodiments.

It is understood that other modifications, changes and substitutions are intended in the foregoing disclosure and in some instances some features of the disclosure will be employed without a corresponding use of other features. Accordingly, it is appropriate that the appended claims be construed broadly and in a manner consistent with the scope of the embodiments disclosed herein.

What is claimed is:

1. A computer system comprising a chassis, a first cover attached to the chassis, memory disposed in the chassis, storage disposed in the chassis, a second cover adapted to replace the first cover, rack mount hardware mounted on one of the covers for engaging a corresponding member in a rack system when the chassis is mounted in the rack system, the other cover being free of any rack mount hardware for use on a desktop, a third cover detachably attached to the chassis, and additional rack mount hardware mountable on the third cover, the third cover extending opposite the second cover when the latter cover is substituted for the first cover, wherein the first cover is free of any rack mount hardware and wherein the rack mount hardware is mounted on the second cover.

2. The computer system of claim 1 wherein the rack mount hardware comprises a rail member adapted to engage a corresponding rail member on the rack system to slidably mount the chassis in the rack system.

3. The computer system of claim 1 wherein, when the chassis is placed on an upright position on the desktop, the first cover forms the top thereof, and when the chassis is placed in the rack system it extends horizontally with the first cover forming a side wall of the chassis.

4. The computer system of claim 1 wherein the first and second covers are detachably connected to the chassis to enable them to be interchanged.

5. A component system comprising a chassis, a first cover attached to the chassis, a second cover adapted to replace the first cover, rack mount hardware mounted on one of the covers for engaging a corresponding member in a rack system when the chassis is mounted in the rack system, the other cover being free of any rack mount hardware for use out of the rack system, a third cover detachably attached to the chassis, and additional rack mount hardware mountable on the third cover, the third cover extending opposite the second cover when the latter cover is substituted for the first cover, wherein the first cover is free of any rack mount hardware and wherein the rack mount hardware is mounted on the second cover.

6. The component system of claim 5 wherein the rack mount hardware comprises a rail member adapted to engage a corresponding rail member on the rack system to slidably mount the chassis in the rack system.

7. The component system of claim 5 wherein the first and second covers are detachably connected to the chassis to enable them to be interchanged.

8. A kit comprising a chassis, a first cover attachable to the chassis, a second cover attachable to the chassis and adapted to replace the first cover, rack mount hardware mounted on one of the covers for engaging a corresponding member in a rack system when the chassis is mounted in the rack system, the other cover being free of any rack mount hardware for use out of the rack system, and additional rack mount hardware mountable on a third cover mounted on the chassis and extending opposite the second cover when it is substituted for the first cover, the first cover being free of any rack mount hardware and wherein the rack mount hardware is mounted on the second cover.

9. The kit of claim 8 wherein the first and second covers are detachably connected to the chassis to enable them to be interchanged.

10. The kit of claim 8 wherein the chassis is a chassis for a computer and further comprising memory disposed in the chassis, and storage disposed in the chassis.

11. A kit comprising a chassis, a first cover attachable to the chassis, a second cover attachable to the chassis and adapted to replace the first cover, rack mount hardware mounted on one of the covers for engaging a corresponding member in a rack system when the chassis is mounted in the rack system, the other cover being free of any rack mount hardware for use out of the rack system, a third cover attachable to the chassis, a fourth cover attachable to the chassis and adapted to replace the third cover, and rack mount hardware mounted on the fourth cover for engaging a corresponding member when the chassis is mounted in a rack system, the third cover being free of any rack mount hardware for use out of the rack system, wherein the first cover is free of any rack mount hardware and wherein the rack mount hardware is mounted on the second cover.

12. The kit of claim 11 wherein the rack mount hardware comprises a rail member adapted to engage a corresponding rail member on the rack system to slidably mount the chassis in the rack system.

13. A method for adapting a chassis for use in a rack mount system, the method comprising removing at least one cover from the chassis, replacing the cover with an additional cover having rack mount hardware mounted thereto, providing rack mount hardware in the rack system, and engaging the hardware on the cover with the hardware in the rack system to mount the chassis in the rack system, wherein the chassis is placed on the surface with the oppositely extending cover extending below the bottom of the chassis.

14. The method of claim 13 further comprising placing additional rack mount hardware on a cover of the chassis extending opposite the additional cover.

15. The method of claim 14 wherein the rack mount hardware on the covers is slidably mounted to the rack mount hardware in the rack system so that, when the additional cover is attached to the chassis and when the rack mount hardware is attached to the oppositely-extending cover, the chassis can be slidably mounted into the rack system.

16. The method of claim 14 further comprising replacing the additional cover with the one cover, and removing the additional rack mount hardware from the oppositely-extending cover to convert the chassis for use on a surface outside of the rack system.

17. The method of claim 13 wherein the chassis is a computer chassis.

18. A method for adapting a chassis for use in a rack mount system, the method comprising providing a first cover for the chassis, providing a second cover to the chassis for replacing the first cover, providing rack mount hardware mounted on one of the covers for engaging a corresponding member in a rack system when the chassis is mounted in the rack system, the other cover being free of any rack mount hardware for use on a desktop, providing a third cover detachably attached to the chassis, and providing additional rack mount hardware mountable on the third cover, the third cover extending opposite the second cover when the latter cover is substituted for the first cover.

19. The method of claim 18 wherein the chassis is a computer chassis.

* * * * *